United States Patent
Chen

(10) Patent No.: US 6,196,821 B1
(45) Date of Patent: Mar. 6, 2001

(54) MOLD ASSEMBLY FOR INJECTION MOLDING FLAT-TYPE HEAT SINKS

(76) Inventor: Lily Chen, P.O. Box 82-144, Taipei (TW)

(*) Notice: Subject to any disclaimer, the term of this patent is extended or adjusted under 35 U.S.C. 154(b) by 0 days.

(21) Appl. No.: 09/232,670

(22) Filed: Jan. 19, 1999

(30) Foreign Application Priority Data

Jan. 16, 1998 (TW) .................................................. 87200753

(51) Int. Cl.⁷ ................................................... B29C 45/14
(52) U.S. Cl. ................ 425/125; 264/272.15; 264/272.17
(58) Field of Search ....................... 264/272.15, 272.17; 425/116, 125, 544, 451.7, 416, 117

(56) References Cited

U.S. PATENT DOCUMENTS

| | | | |
|---|---|---|---|
| 4,470,786 | * 9/1984 | Sano et al. | 425/116 |
| 5,766,650 | * 6/1998 | Peters et al. | 425/116 |
| 5,776,512 | * 7/1998 | Weber | 425/116 |
| 5,989,471 | * 11/1999 | Lian et al. | 425/451.7 |
| 6,030,569 | * 2/2000 | Yu | 425/451.7 |

FOREIGN PATENT DOCUMENTS

287859 * 10/1998 (EP) .................. 264/272.17

* cited by examiner

*Primary Examiner*—Robert Davis
(74) *Attorney, Agent, or Firm*—A & J

(57) ABSTRACT

A mold assembly for injection-molding flat-type heat sinks, includes a male mold, a female mold engageable with the male mold, a base mounted on one side of the female mold and having a cavity in communication with the female mold, and a movable block disposed within the female mold and having one side formed with molding structure, whereby a clearance between a flat-type heat sink and the movable block will be eliminated by moving the movable block against the flat-type heat sink.

1 Claim, 7 Drawing Sheets

MOLD ASSEMBLY FOR INJECTION MOLDING FLAT-TYPE HEAT SINKS

BACKGROUND OF THE INVENTION

This invention is related to a mold assembly for injection-molding flat-type heat sinks.

It has been found that electronic devices such as power supplies are usually sealed within a casing thereby causing problems in cooling the electronic devices. Hence, it is proposed to provide a metal heat sink within the casing.

Most of such heat sinks are generally U-shaped in cross section and partly covered with plastic. As shown in FIG. 1, the metal heat sink 12 is disposed between the male mold 10 and the female mold 11 between which there is a clearance (a) which will cause difficulties in engaging the male mold 10 and the female mold 11 thereby easily causing damage to the molds. Hence, it has been proposed to engage the male mold 10 with the female mold 11 closely without the clearance (a). However, there will be a negative clearance (b) and the plastic will be excessively squeezed to cover the portion (c) which is designed to be not covered by plastic, thereby making it unfit for practical use.

Therefore, it is an object of the present invention to provide a mold assembly for injection-molding flat-type heat sinks which can accurately injection-mold a covering for a flat-type heat sink without causing damage to the mold assembly.

DETAILED DESCRIPTION OF THE PREFERRED EMBODIMENT

Figure 1:
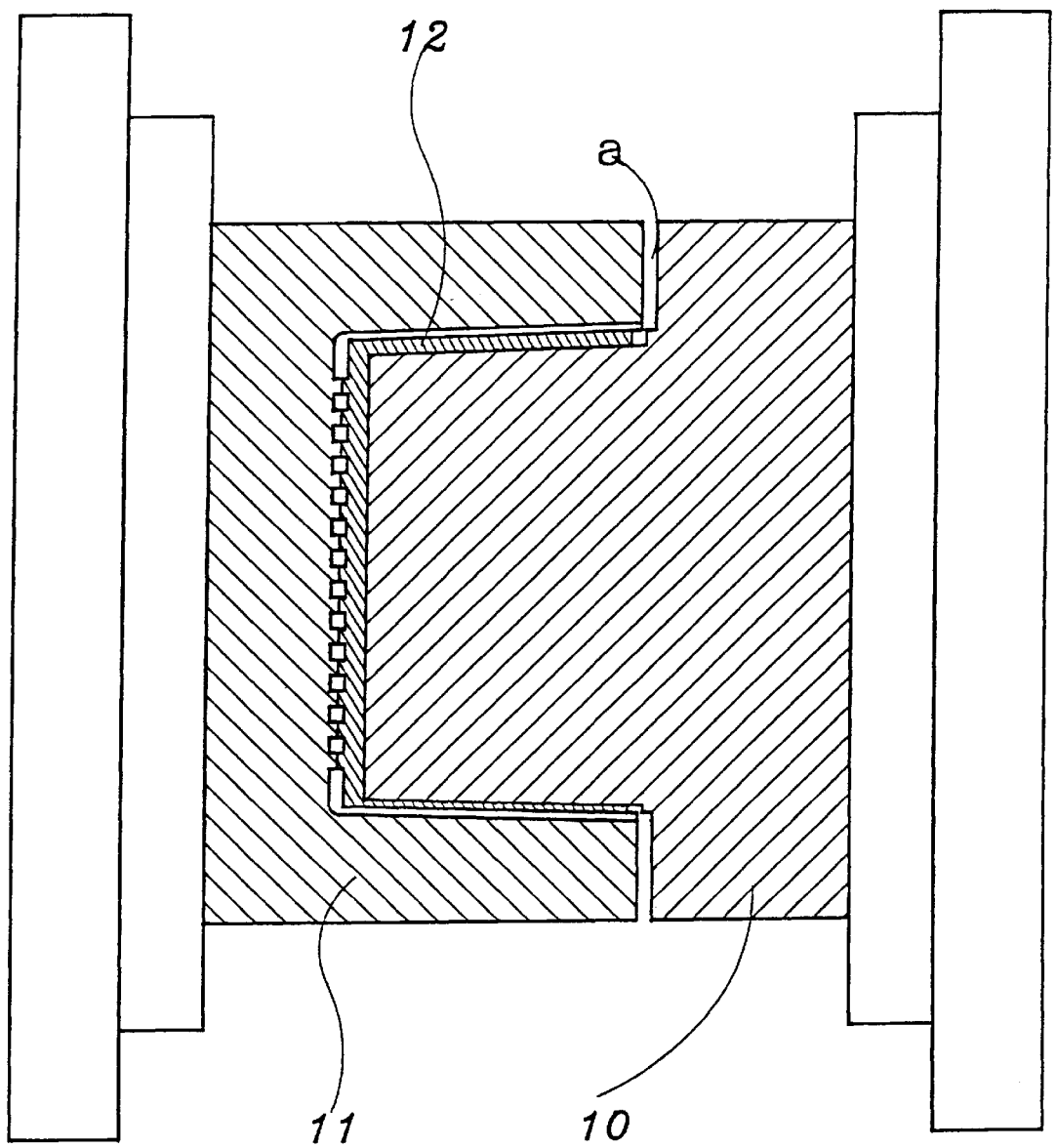
FIG. 1 illustrates a prior art mold assembly with positive clearance for injection-molding flat-type heat sink.
Figure 2:
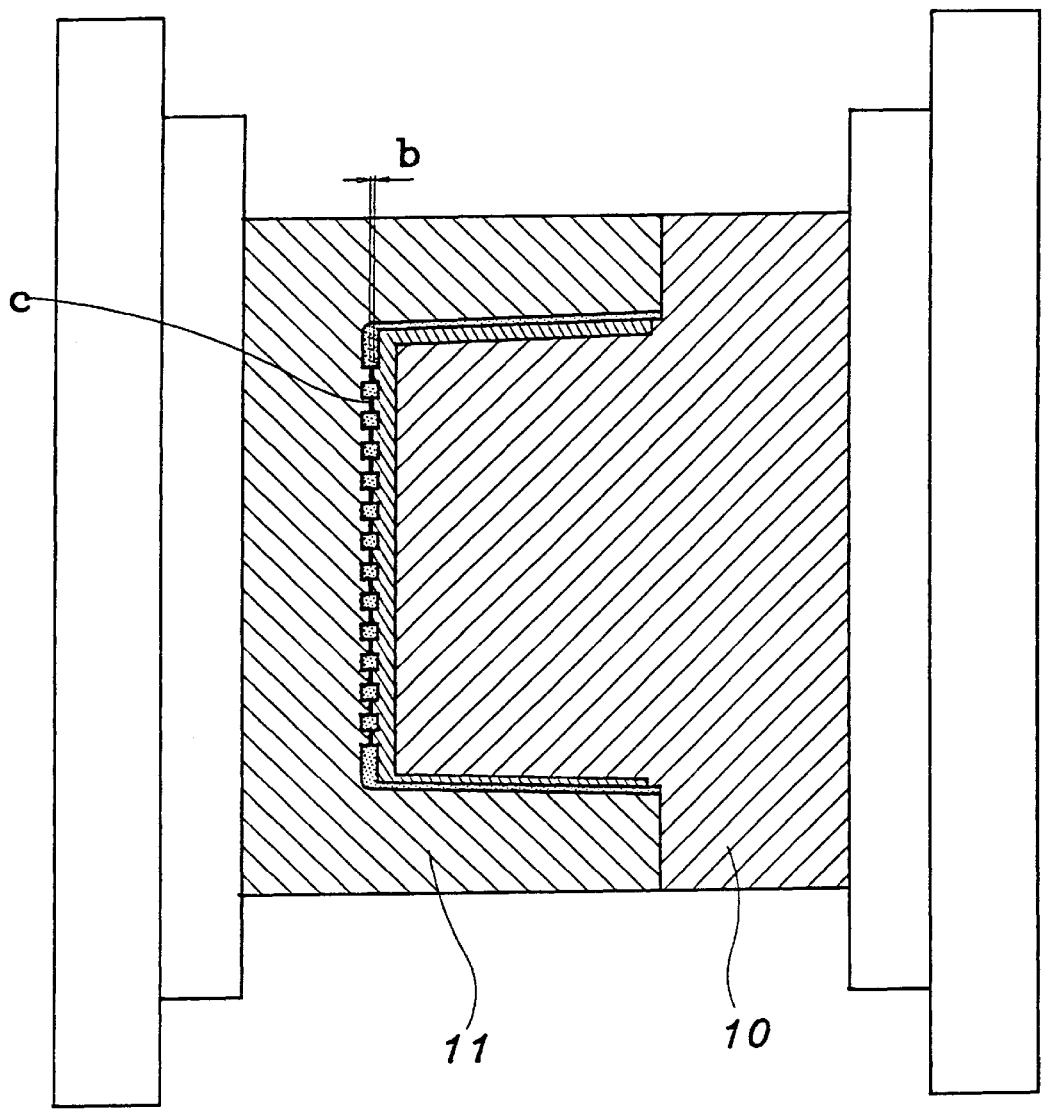
FIG. 2 illustrates another prior art mold assembly with negative clearance for injection-molding flat-type heat sink.
Figure 3:
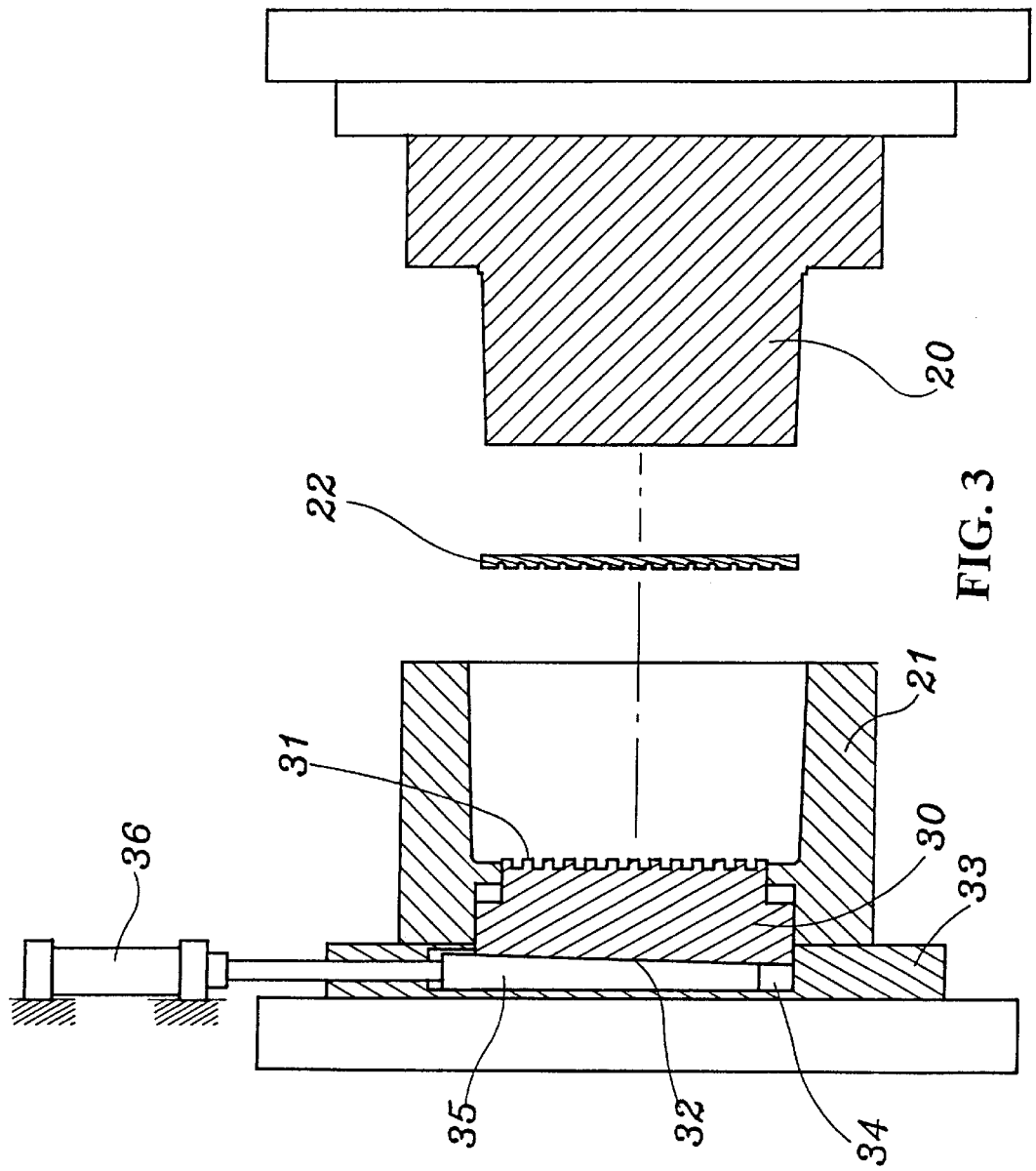
FIG. 3 is an exploded view of the present invention.

Referring to FIG. 3, the mold assembly according to the present invention generally comprises a male mold 20 and a female mold 21. A flat-type heat sink 22 is to be disposed within the female mold 21 for injection-molding.

Figure 4:
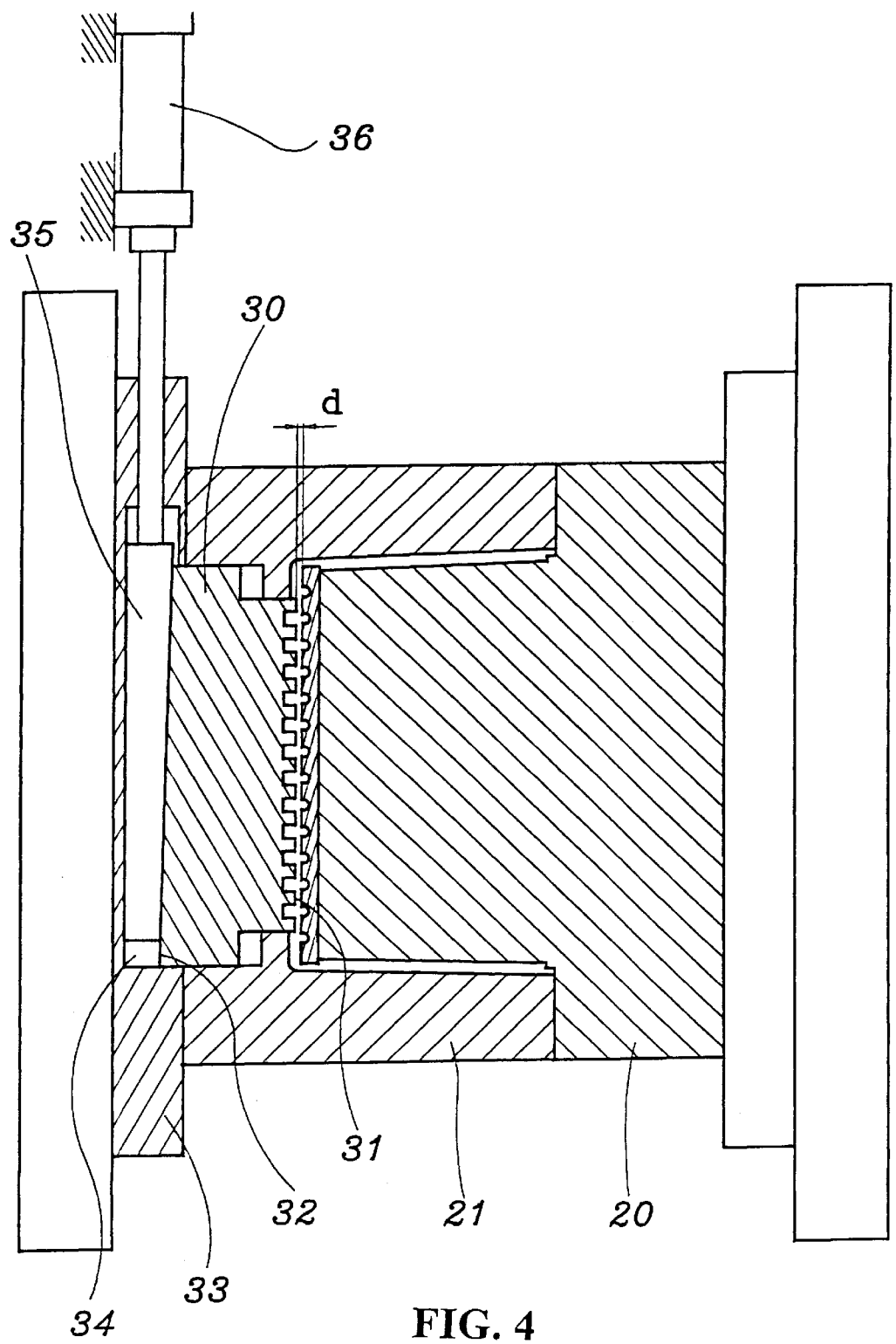
FIG. 4 illustrates the arrangement of a flat-type heat sink in the present invention.

Referring to FIGS. 3 and 4, the female mold 21 is provided with a movable block 30 having an inner side 31 configured to engage with the flat-type heat sink 22 and an inclined outer side 32 thereby forming a space 34 between the inclined outer side 32 and a base 33. The base 33 is mounted at the backside of the female mold 21. A wedge 35 is fitted in the space 34 and driven by a cylinder 36. The flat-type heat sink 22 is first disposed within the female mold 21 with a clearance d from the movable block 30.

Figure 5:
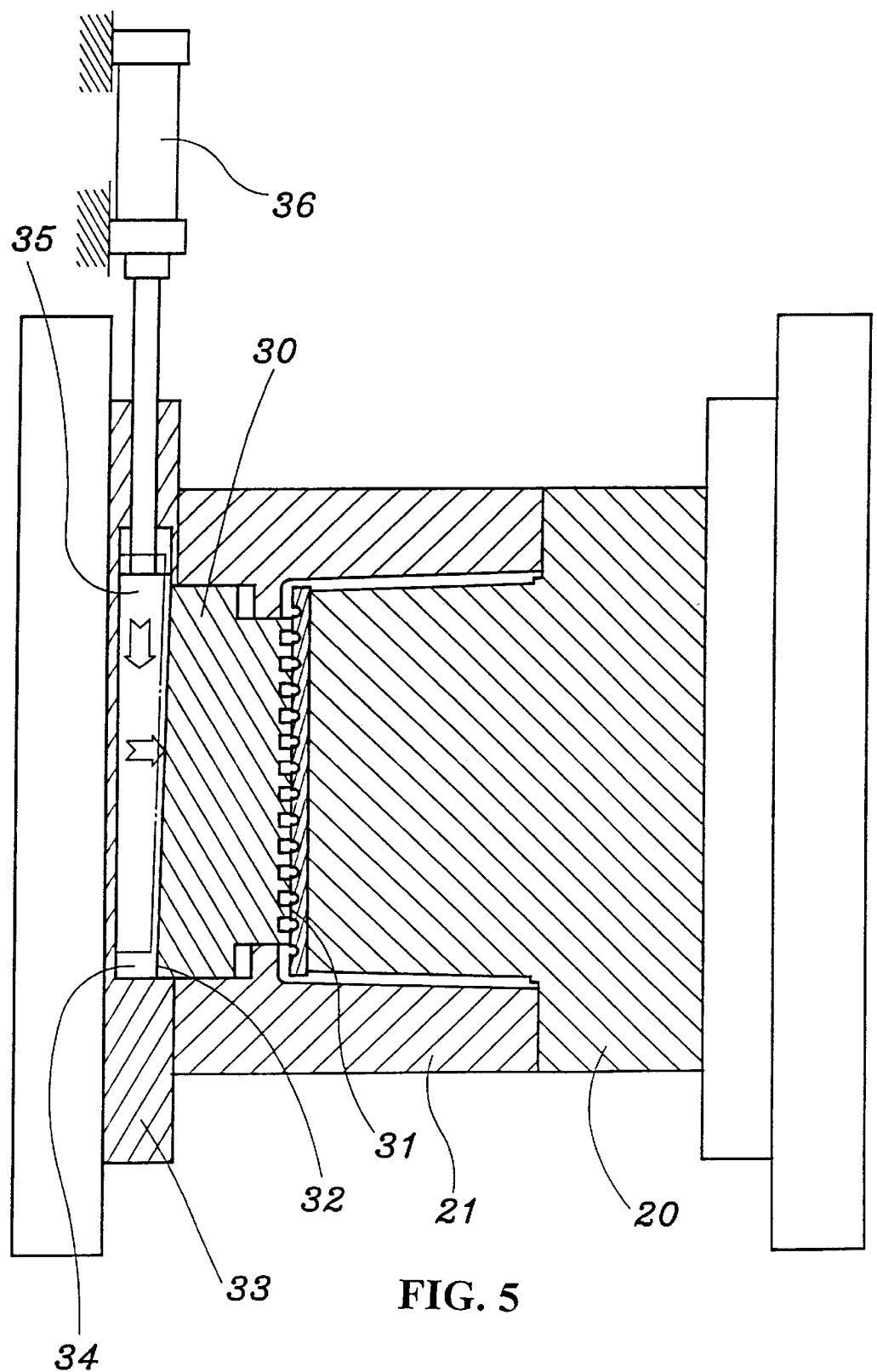
FIG. 5 illustrates how the movable block is moved by the wedge.
Figure 6:
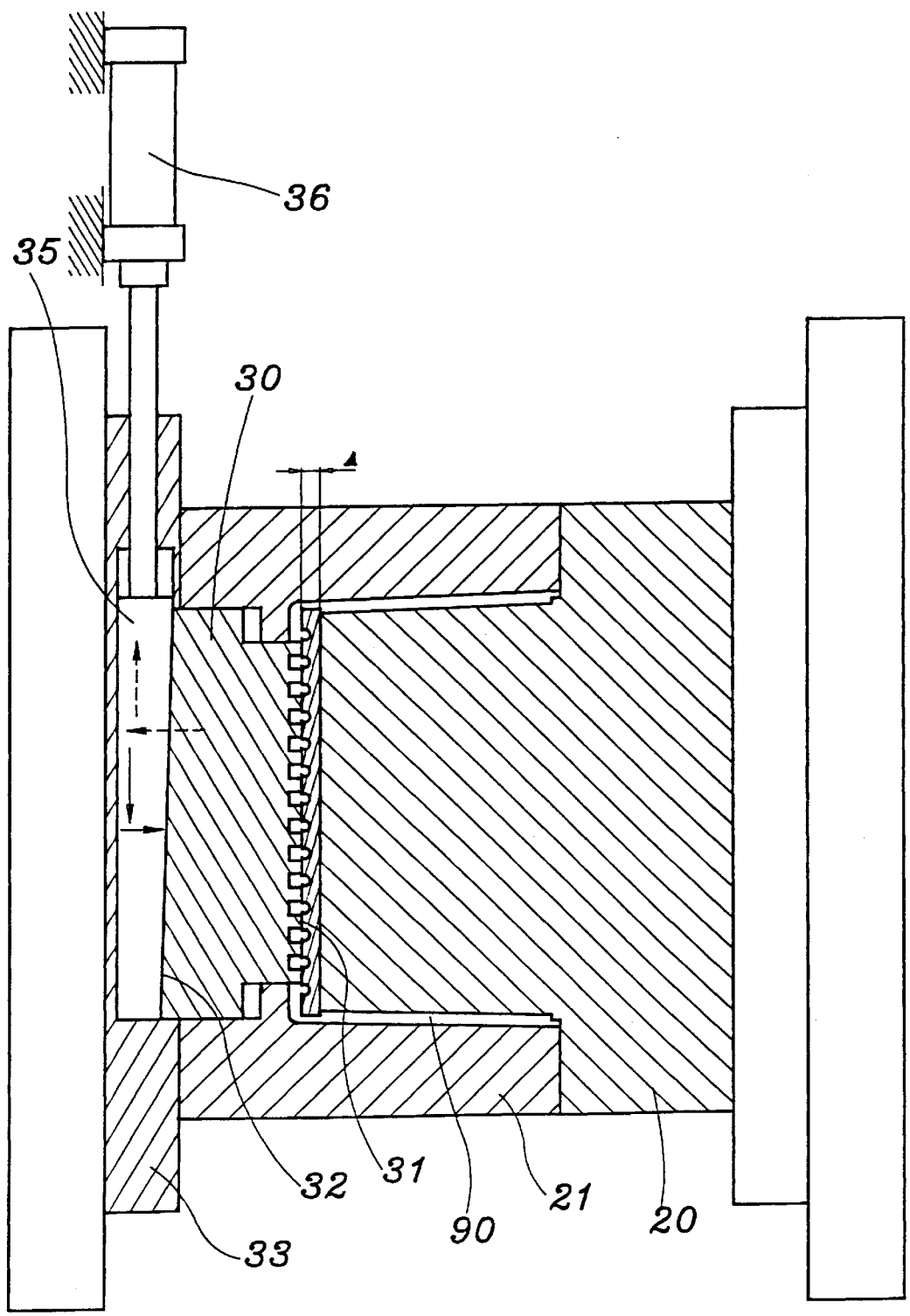
FIG. 6 illustrates the flat-type heat sink which is kept in a fixed position.
Figure 7:
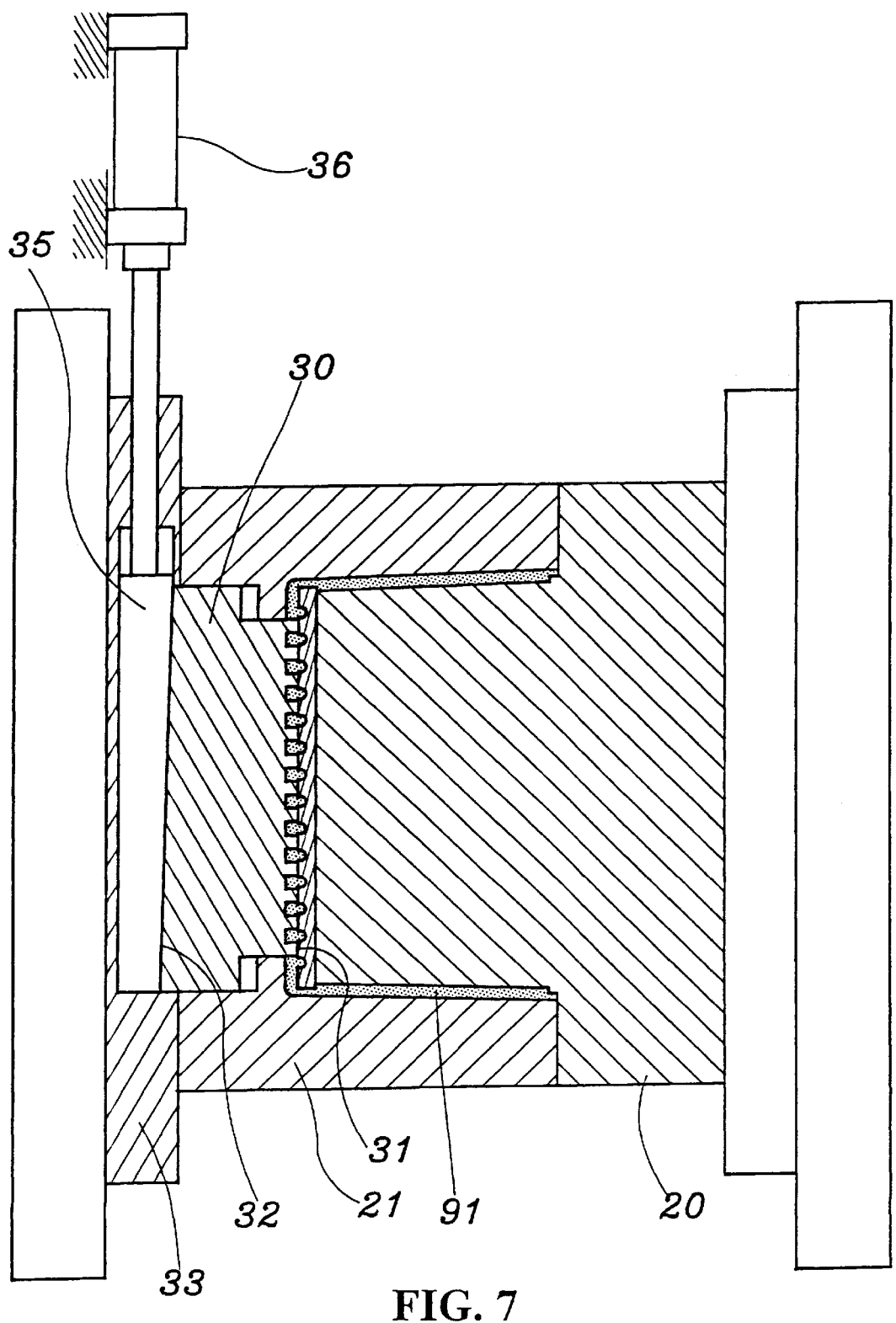
FIG. 7 illustrates injection-molding of a covering for the flat-type heat sink.

When the wedge 35 is pushed downwardly by the cylinder 36, the wedge will force the movable block 30 to move toward the flat-type heat sink 22 thereby eliminating the clearance d, as shown in FIG. 5. Then, the inner side 31 of the movable block 30 is closedly engaged with the flat-type heat sink 22 and a passage 90 is formed for receiving plastic 91, as shown in FIGS. 6 and 7.

In conclusion, the present invention includes a male mold, a female mold engageable with the male mold, a base mounted on one side of the female mold and having a cavity in communication with the female mold, and a movable block disposed within the female mold and having one side formed with molding structure, whereby a clearance between a flat-type heat sink and the movable block will be eliminated by moving the movable block against the flat-type heat sink.

I claim:

1. A mold assembly for injection-molding heat sinks, comprising a male mold, a female mold engageable with said male mold, a base mounted on one side of said female mold and having a cavity in communication with said female mold, and a movable block disposed within said female mold and having one side formed with molding structure, wherein another side of said female mold has an inclined surface partly disposed within said cavity of said base, and a wedge is fitted within said cavity and disposed in contact with said inclined surface so that when said wedge is moved downwardly, said movable block will be displaced horizontally, whereby a clearance between a heat sink and said movable block will be eliminated by moving said movable block against said heat sink.

\* \* \* \* \*